R. GAIGNARD.
RESILIENT WHEEL.
APPLICATION FILED NOV. 20, 1905.

913,819.  Patented Mar. 2, 1909.

Witnesses
Walter L. Maugimm
E. C. Thompson

Inventor
R. Gaignard
By Edward P. Thompson

UNITED STATES PATENT OFFICE.

RAOUL GAIGNARD, OF PARIS, FRANCE.

RESILIENT WHEEL.

No. 913,819.  Specification of Letters Patent.  Patented March 2, 1909.

Application filed November 20, 1905. Serial No. 288,244.

*To all whom it may concern:*

Be it known that I, RAOUL GAIGNARD, a citizen of the French Republic, residing in Paris, in the Republic of France, manufacturer, have invented certain new and useful Improvements in and Connected with Resilient Wheels, for which application has been made in Great Britain, No. 21,744, dated October 25, 1905; in Belgium, dated October 16, 1905; in Germany, patent of addition, dated October 27, 1905; in France, patent of addition, dated October 4, 1905, to Patent No. 356,329, dated July 22, 1905.

This invention relates to an arrangement of resilient wheel intended to dispense with the use of pneumatic tires on the wheels of all kinds of vehicles in general and more particularly on the wheels of motor-cars or automobile vehicles.

According to this arrangement the wheel is composed of two essential parts, a central part preferably constituted like an ordinary wheel, and an external part inclosing the former with which it is connected, with interpolation of springs. These latter are arranged in a particular manner with a view to neutralizing vibration and the jolts due to inequalities of the ground and to avoid their transmission to the axles of the vehicle.

Reference will now be made in the following specification to the accompanying drawings in which:—

Figure 1:
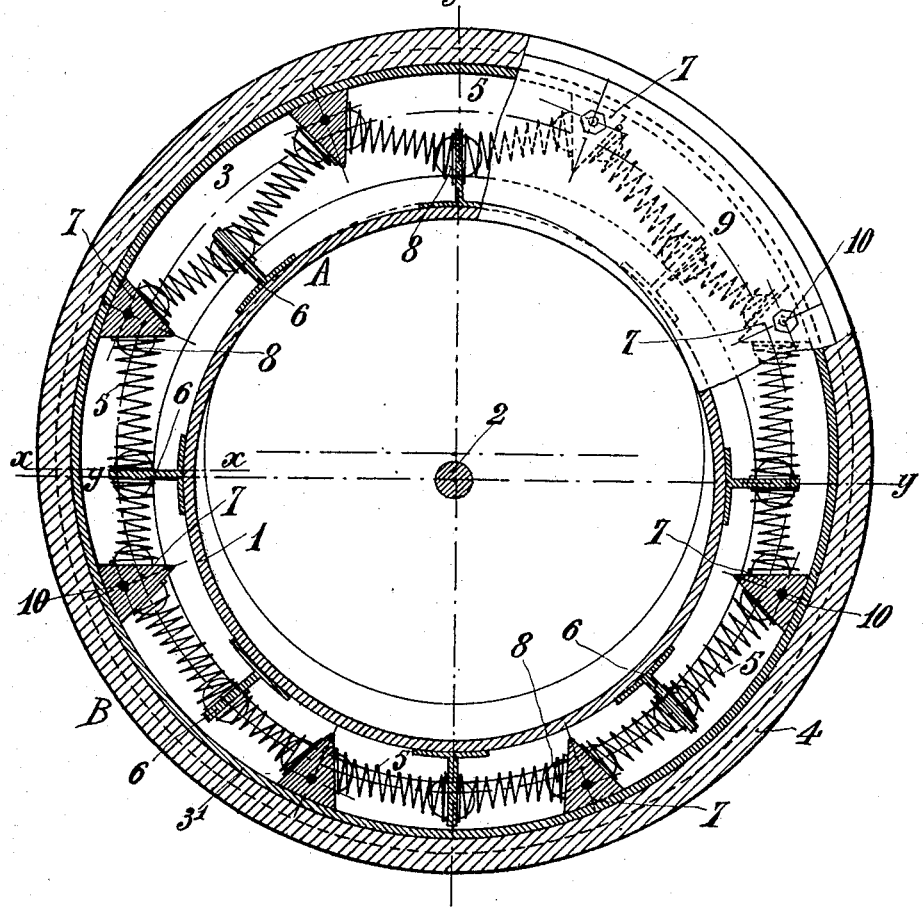
Figure 2:
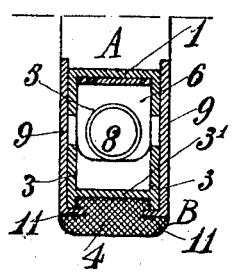

Figure 1 is a front diagrammatic view partially in section, partially in elevation of the resilient wheel in use; Fig. 2 is a partial transverse section on the line $x$—$x$ of Fig. 1.

A is a felly provided with a U shaped groove 1 and rigidly connected to the hub surrounding the axle 2 in any suitable manner, for instance, by means of spokes in such a way that the whole has the appearance of an ordinary wheel. The groove 1 represented in the drawing, may itself constitute the felly A and be connected to the hub surrounding the axle 2 by metal spokes, but it is evident that it may also simply fulfil the office of a tire or nave hoop held on a wooden rim. A second felly B is arranged round the felly A and comprises two lateral rims 3 firmly attached to a hoop $3^1$. The constitution of this felly B enables it to have an internal and an external groove. The latter is intended to receive a suitable tread or running band 4 of any suitable material, but preferably of leather strengthened, or otherwise. The edges of the fellies A and B leave sufficient annular space between them to allow the internal wheel to be displaced relatively to the felly B, as will be hereinafter explained.

Between the essential elements A and B of the wheel, spiral springs 5 of a general double conical form as shown in the drawings, are arranged. These springs have for their object to connect the said parts in an elastic manner, and for this object they are arranged in pairs. The adjacent extremities of each pair of springs bear against an abutment or T piece 6 firmly fixed to the hoop 1, their opposite ends are supported against wedge-shaped pieces 7 firmly attached to the hoop 3 $3^1$.

When the resilient wheel is in use it is evident that the weight of the vehicle is transmitted by the axle 2 to the felly A, which in its turn bears, by the intermediary of the pieces 6, on the springs 5 situated beneath them and which are compressed, while the springs which surmount them are permitted to expand. The position of the springs 5 between the radial brackets or supports 6 and the pieces 7 is exactly determined with a view to yield the most satisfactory results. This position is such that the moment a piece 6 occupies the horizontal position, the axes of the adjacent springs 5 are vertical, that is to say perpendicular to the said piece 6 and consequently in prolongation of one another. In this position the faces of the parts 7 in engagement with the springs 5 just mentioned are parallel to the faces of the piece 6, that is to say horizontal.

To maintain the springs 5 in position, their extremities are preferably fitted over rounded nipples 8 as shown. This construction allows free relative movement of the opposite ends of the springs with a minimum of friction.

Owing to the arrangement just mentioned, the springs 5 all assist in turn in the duty of the support of the internal wheel A, but at the moment when the maximum effort is required from these springs, that is to say when they occupy positions on the horizontal diameter of the wheel, or laterally diametrically opposite to each other, they are found in the position which is most favorable for meeting the requirements.

The resilient wheel in revolving, successively brings the springs 5 into all the positions which they are capable of taking.

When an obstacle is encountered on the road it acts on the tread 4 and pushes up the felly B compressing a little the springs 5 in use, which thus absorb the vibrations and the shocks which are not transmitted to the axle 2, and consequently to the vehicle.

With the object of giving more rigidity to the system, two cheeks or side plates 9 are laterally arranged one on each of the faces of the wheel; they are fixed on the felly B by means of bolts 10 passing, for instance, through the parts 7 (Fig. 1). The cheeks 9 may have on their periphery a flange 11 forming a hook and serving for fixing the tread or band 4, as shown in the drawings.

It is evident that in order to enable the wheel to operate in the manner hereinbefore described, the springs 5 must be slightly compressed or given an initial tension when introduced between the part 6 and the part 7 corresponding to it, and further the projection of these pieces 6 and 7 must be limited so as not to impede the relative movement of the parts A and B.

Any suitable number of springs may be employed, there being of course a corresponding number of supports or abutments 6 and 7. It is highly preferable that the springs should be of the double conical or double truncated form as shown, the medial portions of the springs being of smaller diameter than the ends. This shape of spring and their manner of mounting obviate friction, as the springs, when in action, as well as at other times, do not touch anything whatever excepting the spring-supporting nipples or bosses, at their ends. No guides are needed, as springs of this form are not liable to be deformed or deflected sidewise when subjected to axial pressure, and the initial tension given to the springs is sufficient to retain them firmly in place when extended.

I claim—

1. In a resilient wheel for vehicles, the combination of an outer felly, an inner felly radially spaced from the outer felly to provide an annular space between the fellies, outer abutments extending from the outer felly toward the inner felly inner abutments extending from the inner felly toward the outer felly, the outer and inner abutments being arranged alternately and intermediately of each other, and helical compression springs, each a double truncated cone in shape and acting between the inner and outer abutments and solely by which the inner felly is supported by the outer felly, the springs being entirely free from contact with all objects except the abutments, the springs normally extending at right angles to a diameter of the wheel.

2. A resilient vehicle wheel comprising an outer felly, an inner felly radially spaced from the outer felly to provide an annular space between the fellies, a tread carried by the outer felly, a hub for the wheel, connecting means between the inner felly and the hub, wedge shaped abutments extending from the outer felly into the annular space toward the inner felly, radial brackets extending from the inner felly into the annular space toward the outer felly, the abutments and brackets being arranged alternately and intermediately of each other, and helical compression springs, each a double truncated cone in shape, the bases of the cones forming the ends of the springs, the abutments and the brackets each having rounded nipples over which the enlarged ends of the springs fit, the springs being the sole supporting means between the two fellies, the springs normally extending at right angles to a diameter of the wheel, and the springs being entirely free from contact with any object at all points excepting their ends alone.

In witness whereof, I have hereunto signed my name this 2nd day of November 1905, in the presence of two subscribing witnesses.

RAOUL GAIGNARD.

Witnesses:
 ANTONIN MONTEILHET,
 HANSON C. COXE.